United States Patent
Allen et al.

(10) Patent No.: US 10,221,651 B2
(45) Date of Patent: *Mar. 5, 2019

(54) STEM GUIDE SYSTEM

(71) Applicant: Cameron International Corporation, Houston, TX (US)

(72) Inventors: Stephen Russell Allen, Little Rock, AR (US); John David Williams, Little Rock, AR (US)

(73) Assignee: Cameron International Corporation, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/728,495

(22) Filed: Oct. 9, 2017

(65) Prior Publication Data

US 2018/0094505 A1    Apr. 5, 2018

Related U.S. Application Data

(63) Continuation of application No. 14/504,265, filed on Oct. 1, 2014, now Pat. No. 9,784,068.

(51) Int. Cl.
| | |
|---|---|
| *F16K 31/52* | (2006.01) |
| *E21B 34/02* | (2006.01) |
| *F16K 5/06* | (2006.01) |
| *F16K 31/60* | (2006.01) |
| *F16K 31/528* | (2006.01) |

(52) U.S. Cl.
CPC ............ *E21B 34/02* (2013.01); *F16K 5/0647* (2013.01); *F16K 31/5284* (2013.01); *F16K 31/60* (2013.01)

(58) Field of Classification Search
CPC ........ E21B 34/02; F16K 31/60; F16K 5/0647; F16K 31/5284; F16K 31/528
USPC .................................. 251/163, 229, 251–252
See application file for complete search history.

(56) References Cited

U.S. PATENT DOCUMENTS

| | | | |
|---|---|---|---|
| 1,155,576 A | 10/1915 | Isley | |
| 1,858,590 A * | 5/1932 | Henion | F16K 31/528 251/253 |
| 2,412,529 A * | 12/1946 | Mueller | F16K 5/162 251/163 |
| 2,420,544 A | 5/1947 | Jones | |
| 2,711,302 A * | 6/1955 | McWhorter | F16K 5/0264 251/317 |
| 2,953,344 A | 9/1960 | Yancey | |
| 3,023,783 A * | 3/1962 | Vickery | F16K 31/1635 251/315.09 |
| 3,166,495 A | 1/1965 | Parks | |
| 3,492,880 A * | 2/1970 | Pearson | F16K 31/1635 251/58 |

(Continued)

FOREIGN PATENT DOCUMENTS

| | | |
|---|---|---|
| DE | 19815008 A1 | 10/1999 |
| FR | 1552151 A1 | 1/1969 |

(Continued)

OTHER PUBLICATIONS

PCT International Search Report and Written Opinion; Application No. PCT/US2015/051534; dated Dec. 9, 2015; 13 pages.

*Primary Examiner* — John Bastianelli
(74) *Attorney, Agent, or Firm* — Fletcher Yoder, P.C.

(57) ABSTRACT

A system including a stem guide system, including a stem guide, and a sleeve coupled to the stem guide, wherein the sleeve is configured to rest within a valve stem groove of a valve stem.

20 Claims, 3 Drawing Sheets

(56) References Cited

U.S. PATENT DOCUMENTS

| | | | |
|---|---|---|---|
| 3,515,371 A | | 6/1970 | King et al. |
| 4,234,157 A | | 11/1980 | Hodgeman et al. |
| 4,293,117 A | | 10/1981 | Mueller |
| 4,350,322 A | | 9/1982 | Mueller |
| 4,436,280 A | | 3/1984 | Geisow |
| 4,442,996 A | * | 4/1984 | Erwin .................. F16K 5/0242 251/163 |
| 4,832,078 A | | 5/1989 | Szekely et al. |
| 5,165,657 A | * | 11/1992 | McLennan .......... F16K 31/5284 251/229 |
| 5,263,685 A | | 11/1993 | Winnike et al. |
| 5,405,120 A | * | 4/1995 | Kerpan ................ F16L 37/252 251/143 |
| 5,417,405 A | * | 5/1995 | Stephan ................ F16K 5/204 251/161 |
| 6,007,047 A | | 12/1999 | Phipps |
| 6,648,006 B1 | | 11/2003 | Ostergaard |
| 6,793,194 B1 | | 9/2004 | Grinberg |
| 7,114,697 B2 | | 10/2006 | Miller et al. |
| 2010/0117013 A1 | * | 5/2010 | Laurent ................ F16H 25/186 251/77 |
| 2012/0138831 A1 | * | 6/2012 | Ridolfi .................... F16K 31/53 251/248 |

FOREIGN PATENT DOCUMENTS

| | | | |
|---|---|---|---|
| GB | 563699 A | 8/1944 | |
| GB | 2397363 A | 7/2004 | |

* cited by examiner

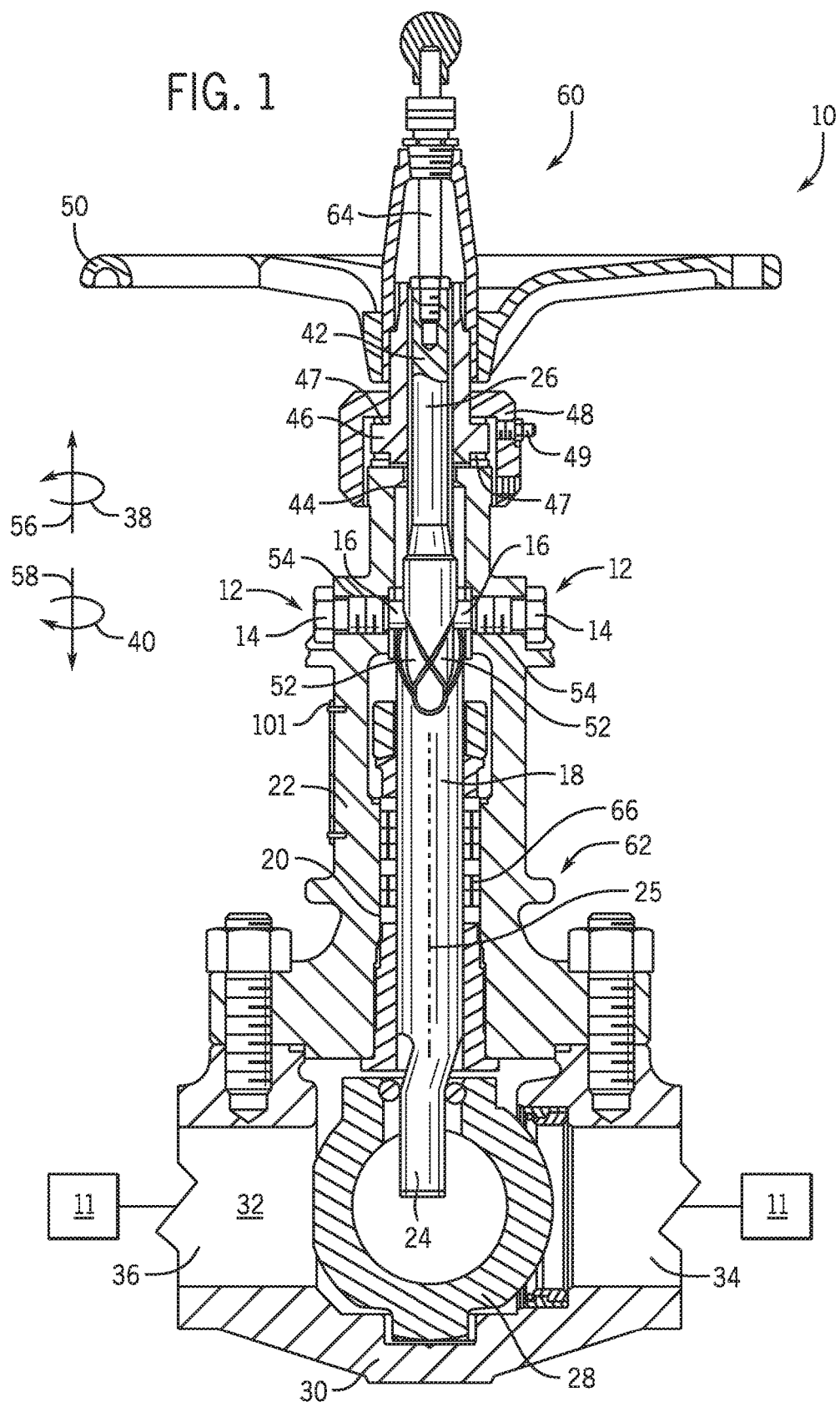

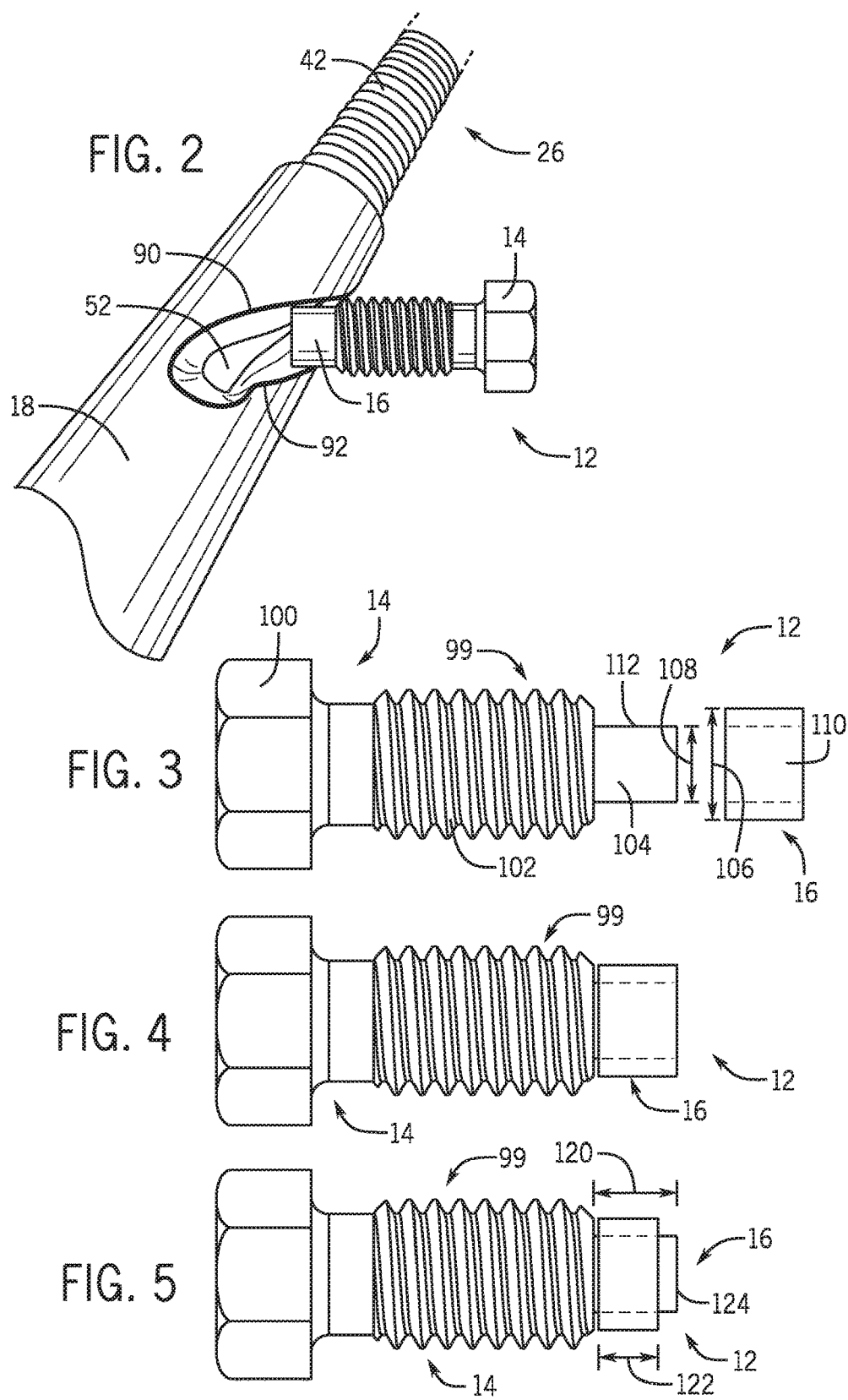

STEM GUIDE SYSTEM

CROSS-REFERENCE TO RELATED APPLICATION

This application is a continuation of U.S. patent application Ser. No. 14/504,265, entitled "Stem Guide System", filed on Oct. 1, 2014, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Ball valves are used in a variety of applications to control the flow of fluids. Ball valves typically include a rotatable ball disposed within a body, a valve stem coupled to the ball, and a stem guide coupled to the stem. In operation, the stem guide rotates the valve stem as the valve stem moves axially within the ball valve. The rotation of the valve stem in turn rotates a ball to open and close the ball valve. Unfortunately, over time the contact between the stem guide and the valve stem may wear both components.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 1 is a cross-sectional side view of an embodiment of a valve system with a stem guide system;

FIG. 2 is a perspective view of an embodiment of a valve stem and a stem guide system;

FIG. 3 is a side view of an embodiment of a stem guide system;

FIG. 4 is a side view of an embodiment of a stem guide system;

FIG. 5 is a side view of an embodiment of a stem guide system;

DETAILED DESCRIPTION OF SPECIFIC EMBODIMENTS

Figure 6:
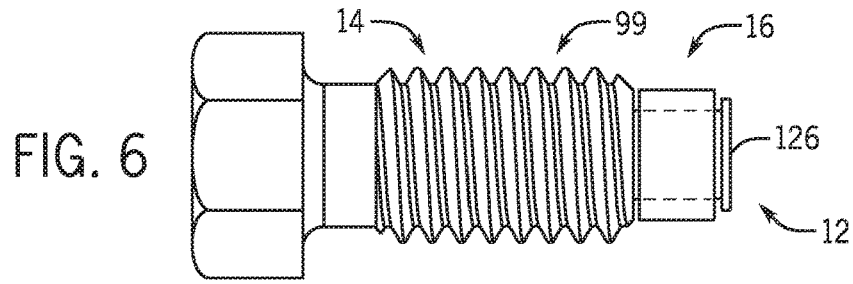
FIG. 6 is a side view of an embodiment of a stem guide system.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The disclosed embodiments include a stem guide system that reduces wear in a valve system. The stem guide system may include a stem guide and a sleeve coupled to the stem guide. In operation, the sleeve (e.g., sleeve bearing) may act as a bearing to reduce friction between a valve stem and the stem guide. For example, the sleeve may rotate relative to the stem guide. The sleeve may also be made from a material that differs from that used in both the stem guide and the valve stem to reduce friction, reduce wear, and prevent galling (e.g., when one component loses material to another component because of heat or molecular attraction resulting from friction). By reducing wear, the stem guide system reduces maintenance and may increase the life of the valve system or components within the valve system.

FIG. 1 is a cross-sectional side view of an embodiment of a valve system 10 with one or more stem guide systems 12 (e.g., 1, 2, 3, 4, or more). In certain embodiments, the valve system 10 may be coupled to a mineral extraction system 11 (e.g., a hydrocarbon extraction system), which may include a well head assembly, a Christmas tree, hydrocarbon piping, pumps, blowout preventers, or any combination thereof. As illustrated, the stem guide system 12 may include a stem guide 14 and a sleeve 16 (e.g., annular sleeve) coupled to the stem guide 14. As will be explained in greater detail below, the sleeve 16 acts as a bearing that reduces wear (e.g., galling) between the stem guide 14 and the valve stem 18.

As illustrated, the valve stem 18 extends through a bore 20 in a bonnet 22 (e.g., housing). The valve stem 18 includes a first end 24 and a second end 26 that are axially opposite to one another relative to a rotational axis 25. Coupled to the first end 24 of the valve stem 18 is a valve member 28 (e.g., a ball). In operation, the valve stem 18 rotates the valve member 28 about the axis 25 in a body 30 to block or enable fluid to pass through an aperture 32 between a fluid inlet 34 and a fluid outlet 36 of the body 30. Depending on the embodiment, the valve member 28 may rotate in either circumferential direction 38 or 40 about the axis 25 to open and close the aperture 32.

The second end 26 of the valve stem 18 includes a threaded portion 42 that extends through an aperture 44 in the bonnet 22 enabling the second end 26 to threadingly couple to a stem nut 46. The stem nut 46 is then axially held in place with a bonnet nut 48 that threadingly couples to the bonnet 22. To facilitate rotation of the stem nut 46, the valve system 10 may include bearings 47 between the stem nut 46 and the bonnet 22, and bearings 47 between the stem nut 46 and the bonnet nut 48. In some embodiments, the bonnet nut 48 may include a fitting 49 that provides access for lubricating the bearings 47. In order to drive the stem nut 46, the valve system 10 includes an actuator 50 (e.g., wheel) that couples to the stem nut 46. In some embodiments, the valve system 10 may have an automatic actuator instead of a manual actuator or have a combination of a manual and automatic actuator. For example, the automatic actuator may include a powered actuator, such as an electric motor driven actuator or a hydraulically driven actuator. As will be explained in greater detail below, the actuator 50 rotates the stem nut 46 to axially drive the valve stem 18, which then rotates the valve member 28 between open and closed positions.

In between the first and second ends 24, 26, the valve stem 18 includes one or more grooves 52 (e.g., 1, 2, 3, 4, or more) that receive a respective stem guide system 12. For example, each of the grooves 52 may be an angled groove or a curved groove, such as a spiral groove. The groove 52 may be oriented at an acute angle relative to the rotational axis 25, such that the groove 52 extends partially along the stem 18 in the axial direction and partially around the stem 18 in the circumferential direction. As illustrated, the stem guide systems 12 couples to the bonnet 22 through one or more apertures 54 (e.g., 1, 2, 3, 4, or more). For example the stem guides 14 may be threaded into the apertures 54 of the bonnet 22 enabling each sleeve 16 to extend into the bore 20 and rest within a respective groove 52. In operation, as the valve stem 18 moves in axial directions 56 and 58, the contact between the grooves 52 and the stem guide system 12 forces the valve stem 18 to rotate. Indeed, as the actuator 50 rotates in either direction 38 or 40, the stem nut 46 rotates. As the stem nut 46 rotates, the threaded contact between the stem nut 46 and the valve stem 18 enables the stem nut 46 to drive the valve stem 18 in axial directions 56 and 58. For example, rotation in the clockwise direction 40 may drive the valve stem 18 in axial direction 58. As the valve stem moves in axial direction 58, the contact between the grooves 52 and the stem guide systems 12 rotates the valve stem 18. Rotation of the valve stem 18 then rotates the valve member 28 into a closed position. Similarly, rotating the actuator 50 in the counter-clockwise direction 38 rotates the stem nut 46 in direction 38, which drives the valve stem 18 in axial direction 56. As the valve stem 18 moves in axial direction 56, the contact between the grooves 52 and the stem guide systems 12 rotates the valve stem 18. Rotation of the valve stem 18 then rotates the valve member 28 into an open position, enabling fluid flow through the aperture 32.

In some embodiments, the valve system 10 may include a visual position indicator system 60 and a packing system 62. In operation, the visual indicator system 60 visually indicates the position of the valve member 28 (e.g., completely open, completely closed, partial open, partially closed). For example, the visual indicator system 60 may include a rod 64 coupled to the valve stem 18. The rod 64 may include markings that enable an operator to quickly identify the position of the valve member 28. Accordingly, as the rod 64 moves axially with the valve stem 18, different marking may be visible to an operator indicating the position of the valve member 28. The packing system 62 may include one or more gaskets or seals 66 (e.g., annular gaskets or seals) that block of the flow of fluid through the bonnet 22.

FIG. 2 is a perspective view of an embodiment of the valve stem 18 and the stem guide system 12. As illustrated, groove 52 includes a first curved or turning wall 90 (e.g., spiral wall) that opposes a second curved or turning wall 92 (e.g., spiral wall). In operation, contact between the first and second walls 90, 92 and the stem guide system 12 enable the stem guide system 12 to rotate the valve stem 18. Rotation of the valve stem 18 then rotates the valve member 28 between open and closed positions. While FIG. 2 illustrates a spiral groove 52, some embodiments may include a valve stem with a groove 52 with different geometrical portions, such as curved portions, acutely angled portions, axial portions, semi-circular portions, etc. As explained above, direct contact between the stem guide 14 and the groove 52 (e.g., walls 90 and 92) may cause wear (e.g., galling). Accordingly, the stem guide system 12 includes the sleeve 16 coupled to the stem guide 14. In operation, the sleeve 16 may act as a bearing between the valve stem 18 and the stem guide 14 reducing wear on both components. In some embodiments, the sleeve 16 may be made from a material that is different from the stem guide 14 and/or the valve stem 18. For example, the sleeve 16 may be made out of hardened or surface-enhanced materials (e.g., Inconel 718, Stellite 6, Tungsten Carbide, AISI 52100), while the stem guide 14 and valve stem 18 are made out of high strength materials dictated by the respective valve design. For example the stem guide 14 may be made out of AISI 4140, ASTM A638 Grade 660, Inconel 718, while the valve stem 18 may be made out of AISI 8620, AISI 9310, ASTM A638 Grade 660, Inconel 718, Nitronic 50. The difference in materials between the stem guide 14, the sleeve 16, and/or the valve stem 18 may reduce or block galling.

FIG. 3 is a side view of an embodiment of the stem guide system 12 with the stem guide 14 and the sleeve 16. In some embodiments, the stem guide 14 may include a shaft portion 99 extending from a head portion 100 (e.g., tool interface head portion), wherein the shaft portion 99 includes a threaded portion 102 and an unthreaded portion 104. In operation, the threaded portion 102 enables the stem guide 14 to couple to the bonnet 22, while the head portion 100 contacts an exterior surface 101 of the bonnet 22 to block over insertion of the stem guide 14. As illustrated, the threaded portion 102 has a diameter 106 that is greater than the diameter 108 of the unthreaded portion 104. This enables the unthreaded portion 104 to couple to the sleeve 16, and for insertion of both components through the aperture 54 in the bonnet 22 and into the groove 52 of the valve stem 18. In order to couple the sleeve 16 to the stem guide 14, the sleeve 16 may have an aperture 110 with a diameter equal to or slightly greater than diameter 108, which enables the sleeve 16 to slide over the unthreaded portion 104 when coupling to the stem guide 14. The unthreaded portion 104 may include a smooth cylindrical exterior surface 112. In operation, the smooth cylindrical exterior surface 112 of the stem guide 14 reduces friction between the stem guide 14 and the sleeve 16, enabling the sleeve 16 to rotate about the stem guide 14. FIG. 4 illustrates the sleeve 16 coupled to the stem guide 14. In some embodiments, the sleeve 16 may be flush with the unthreaded portion 104 when coupled to the stem guide 14.

FIG. 5 is a side view of an embodiment of the stem guide system 12 with the sleeve 16 coupled to the stem guide 14. As illustrated, a length 120 of the unthreaded portion 104 may be greater than a length 122 of the sleeve 16, exposing an end 124 of the unthreaded portion 104. In some embodiments, after coupling the sleeve 16 to the stem guide 14, the end 124 may be deformed and/or additional material added (e.g., welding, brazing, etc) to form a lip 126 (e.g., annular lip). FIG. 6 illustrates the stem guide 14 with the lip 126. In operation, the lip 126 blocks removal of the sleeve 16 while still allowing the sleeve 16 to rotate. Accordingly, during maintenance or inspection, the sleeve 16 will not separate from the stem guide 14 when the stem guide system 12 is removed from the bonnet 22.

Figure 7:
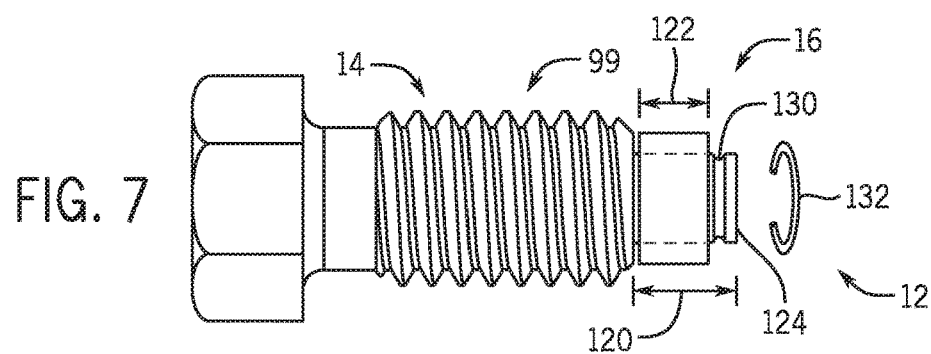
FIG. 7 is a side view of an embodiment of a stem guide system.
Figure 8:
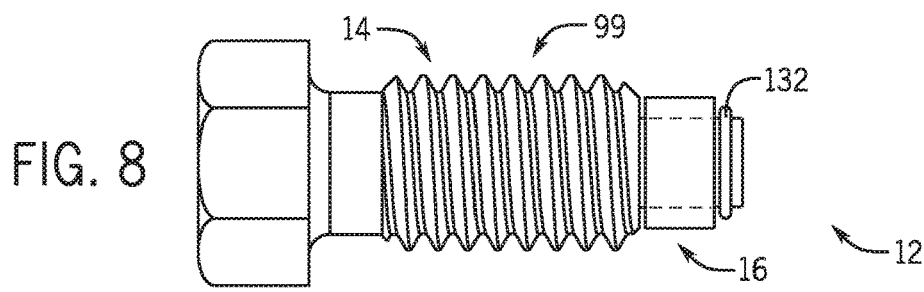
FIG. 8 is a side view of an embodiment of a stem guide system.

FIG. 7 is a side view of an embodiment of the stem guide system 12 with the sleeve 16 coupled to the stem guide 14. As illustrated, the length 120 of the unthreaded portion 104 may be greater than the length 122 of the sleeve 16 exposing the end 124 of the unthreaded portion 104. However, instead of deforming or adding material to the end 124, the end 124 may include a groove 130 (e.g., annular groove) that receives a ring 132 (e.g., c-ring). FIG. 8 illustrates the ring 132 coupled to the groove 130. In operation, the ring 132 blocks removal of the sleeve 16. Accordingly, during maintenance or inspection, the sleeve 16 will not separate from the stem guide 14 when the stem guide system 12 is removed from the bonnet 22.

Figure 9:
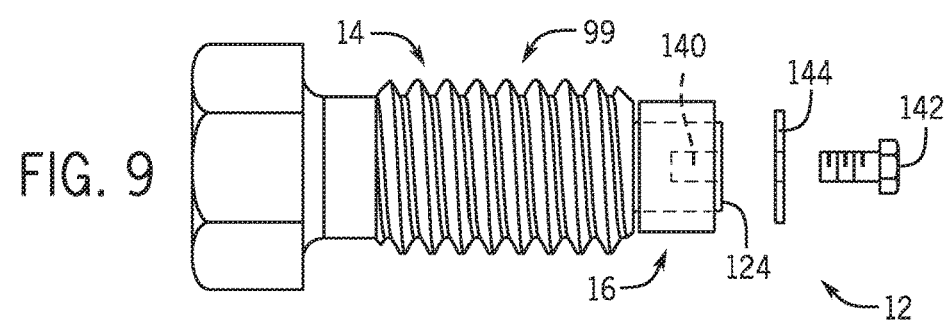
FIG. 9 is a side view of an embodiment of a stem guide system.
Figure 10:
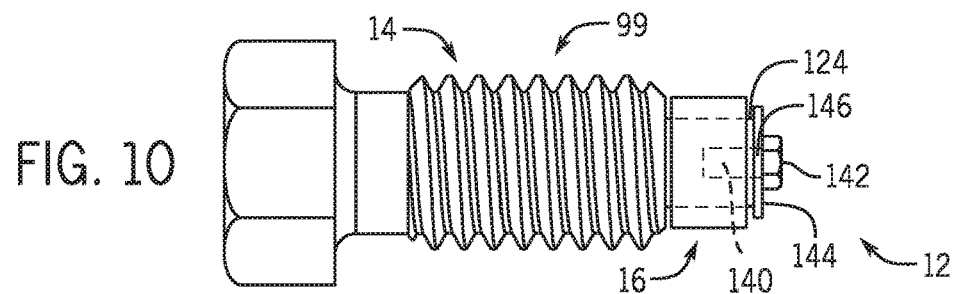
FIG. 10 is a side view of an embodiment of a stem guide system.

FIG. 9 is a side view of an embodiment of the stem guide system 12 with the stem guide 14 and the sleeve 16. In some embodiments, the end 124 of the stem guide may include an aperture 140 that enables a pin or screw 142 to couple to the stem guide 14 to retain a ring 144 (e.g., a washer). In other embodiments, the pin or screw 142 may be integrally formed with the ring 144. As illustrated in FIG. 10, the pin or screw 142 couples to the stem guide 14 retaining the ring 144 against the end 124 of the stem guide 14. In operation, the ring 144 blocks removal of the sleeve 16. Accordingly, during maintenance or inspection, the sleeve 16 will not separate from the stem guide 14 when the stem guide system 12 is removed from the bonnet 22.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a housing;
a first stem guide assembly configured to couple to the housing having a stem with a first stem groove that turns at least partially about an axis of the stem, wherein the first stem guide assembly comprises:
a first stem guide comprising a shaft having a first shaft portion and a second shaft portion, the first shaft portion is configured to extend through a wall of the housing, and the second shaft portion is configured to be disposed inside a chamber in the housing, and the first stem guide is configured to be assembled with the housing and the stem such that the second shaft portion extends from the first shaft portion partially into the stem and terminates at a tip portion disposed inside the stem; and
a first sleeve disposed about the second shaft portion of the first stem guide, wherein the first sleeve is configured to rotate relative to the first stem guide, and the first sleeve is configured to contact and move along the first stem groove.

2. The system of claim 1, wherein the second shaft portion has a diameter smaller than the first shaft portion.

3. The system of claim 2, wherein the first shaft portion includes threads coupling the first stem guide to the wall of the housing, and the second shaft portion excludes threads.

4. The system of claim 1, wherein the shaft of the first stem guide is disposed in a stationary position while the first sleeve is configured to contact and move along the first stem groove.

5. The system of claim 2, wherein the first stem guide comprises a retainer portion coupled to the second shaft portion, and the first sleeve is disposed between the second shaft portion and the retainer portion.

6. The system of claim 5, wherein the retainer portion comprises an annular lip portion fixed to the shaft.

7. The system of claim 5, wherein the retainer portion comprises a removable retainer coupled to the shaft, and the removable retainer is disposed at least partially in a recess in the shaft.

8. The system of claim 1, comprising the stem disposed in the housing, wherein the first shaft portion extends through the wall of the housing, the first sleeve is disposed in the first stem groove inside the chamber in the housing, and a head of the first stem guide is disposed outside of the housing.

9. The system of claim 1, wherein the first stem groove comprises a first spiral groove.

10. The system of claim 1, comprising:
a second stem guide assembly configured to couple to the housing having the stem with a second stem groove, wherein the second stem guide assembly comprises:
a second stem guide; and
a second sleeve coupled to the second stem guide, wherein the second sleeve is configured to rotate relative to the second stem guide, the second sleeve is configured to move along the second stem groove, and a second material or a second wear resistance of the second sleeve is different from the second stem guide or the stem;
wherein the first stem groove comprises a first spiral groove, and the second stem groove comprises a second spiral groove.

11. The system of claim 1, comprising a valve coupled to the stem.

12. The system of claim 1, wherein a first material of the first sleeve is different from the first stem guide and the stem.

13. The system of claim 1, wherein a first wear resistance of the first sleeve is different from the first stem guide and the stem.

14. The system of claim 1, wherein a first wear resistance of the first sleeve is greater than the first stem guide or the stem.

15. A system, comprising:
a housing;
a stem disposed inside a chamber in the housing, wherein the stem comprises a first stem groove having a first spiral groove portion; and
a first stem guide assembly coupled to the housing, wherein the first stem guide assembly comprises:
a first stem guide comprising a shaft having a first shaft portion and a second shaft portion, wherein the first shaft portion extends through a wall of the housing, the second shaft portion is disposed inside the chamber in the housing, and the first stem guide is assembled with the housing and the stem such that the second shaft portion extends from the first shaft portion partially into the stem and terminates at a tip portion disposed inside the stem; and
a first sleeve disposed about the second shaft portion of the first stem guide, wherein the first sleeve is configured to rotate relative to the first stem guide, and the first sleeve is configured to contact and move along the first stem groove.

16. The system of claim 15, wherein the first shaft portion includes threads coupling the first stem guide to the wall of the housing, and the second shaft portion excludes threads.

17. The system of claim 15, wherein the shaft of the first stem guide is disposed in a stationary position while the first sleeve is configured to contact and move along the first stem groove.

18. The system of claim 15, wherein the second shaft portion has a diameter smaller than the first shaft portion, and a diameter of the first sleeve is smaller than the first shaft portion.

19. The system of claim 15, comprising a valve coupled to the stem.

20. A system, comprising:
- a housing;
- a first stem guide assembly configured to couple to the housing having a stem with a first stem groove that turns at least partially about an axis of the stem, wherein the first stem guide assembly comprises:
  - a first stem guide configured to mount in a stationary position relative to the housing and the stem, wherein the first stem guide is configured to be assembled with the housing and the stem such that the first stem guide extends only partially into the stem and terminates at a tip portion disposed inside the stem; and
  - a first sleeve coupled to the first stem guide, wherein the first sleeve is configured to rotate relative to the first stem guide, the first sleeve is configured to contact and move along the first stem groove, and a first material or a first wear resistance of the first sleeve is different from the first stem guide and the stem.

* * * * *